United States Patent
Malik

[19]
[11] Patent Number: 5,974,131
[45] Date of Patent: *Oct. 26, 1999

[54] CALL FORWARDING ON BUSY OR NO ANSWER WHEN CALL WAITING IS ACTIVE

[75] Inventor: Dale W. Malik, Dunwoody, Ga.

[73] Assignee: BellSouth Intellectual Property Corporation, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/682,368

[22] Filed: Jul. 17, 1996

[51] Int. Cl.⁶ .................................................. H04M 1/64
[52] U.S. Cl. ........................ 379/215; 379/70; 379/88.26
[58] Field of Search ................................ 379/67, 88, 89, 379/215, 214, 393, 68, 70, 77, 88.22, 88.23, 88.24, 88.25, 88.26

[56] References Cited

U.S. PATENT DOCUMENTS

| | | | |
|---|---|---|---|
| 4,947,421 | 8/1990 | Toy et al. | 379/215 |
| 5,007,076 | 4/1991 | Blakley | 379/215 |
| 5,309,512 | 5/1994 | Blackmon et al. | 379/215 |
| 5,434,906 | 7/1995 | Robinson et al. | 379/214 |
| 5,471,519 | 11/1995 | Howe et al. | 379/89 |
| 5,668,853 | 9/1997 | Florence et al. | 379/215 |

*Primary Examiner*—Fan S. Tsang
*Attorney, Agent, or Firm*—Nora M. Tocups; Kilpatrick Stockton LLP

[57] ABSTRACT

A method and an apparatus for handling incoming calls when call waiting is active. If the called party is not on a call when an incoming call occurs and the called party does not answer the incoming call then a message is played to the calling party that the called party did not answer, and the called party is given the opportunity to record a message for the called party. If the called party is on a call when an incoming call occurs and, after the call waiting signal is played to the called party, the called party does not answer the incoming call then a message is played to the calling party that the called party is busy, and the called party is given the opportunity to record a message for the called party. If the called party is engaged in a first call and a second call when an incoming call occurs then a message is played to the calling party that the called party is busy, and the called party is given the opportunity to record a message for the called party. Therefore, even when call waiting is active, the calling party is properly advised of the reason that the called party did not answer the incoming call.

13 Claims, 6 Drawing Sheets

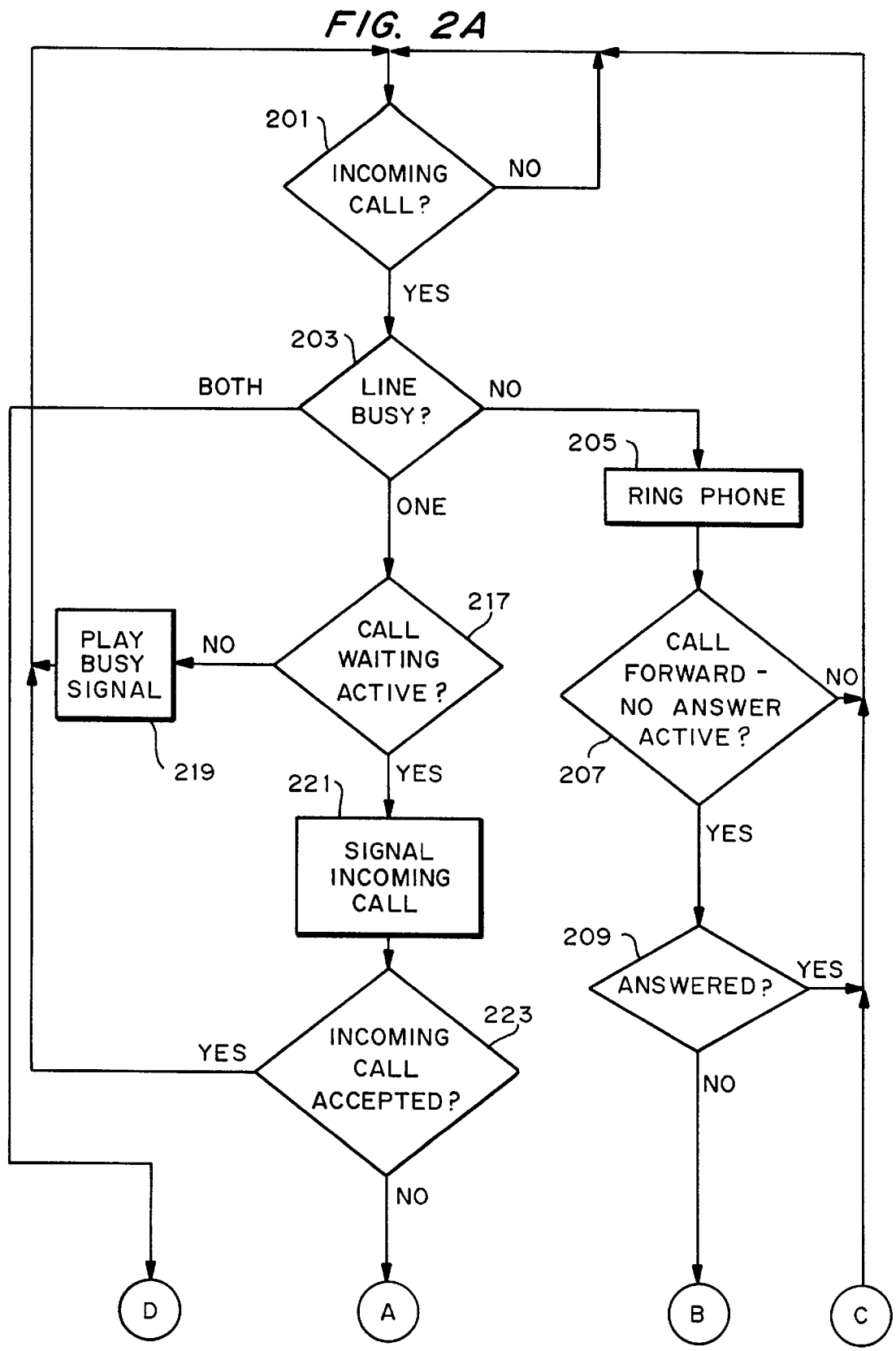

5,974,131

CALL FORWARDING ON BUSY OR NO ANSWER WHEN CALL WAITING IS ACTIVE

TECHNICAL FIELD

This invention relates to the processing of incoming telephone calls and, more particularly, is a method and an apparatus for processing an incoming call to a telephone number which has call waiting based upon the busy/not busy status of that telephone number.

BACKGROUND OF THE INVENTION

For a long time, most people had only one telephone line or number to a household and only one call could be handled at a time. If a called party was using the telephone when a calling party tried to call, the calling party simply received a busy signal.

However, some people wanted to be able to receive a second telephone call even when they were already on a first telephone call. This need was accommodated by installing a second telephone number and a second telephone line, and rolling over (transferring) an incoming call to the second telephone number/line when the first telephone number/line was busy.

This approach required that an additional number be assigned at the central office, and that an additional line be run from the central office to the house. This increased the cost of the telephone service to the consumer. Also, this approach required that the consumer either have two telephones or have a telephone that could switch between the two telephone lines/numbers. Two telephone sets cost more and take up more space than one telephone set, and a multiple-line telephone set costs more than a single line telephone set. Some businesses were willing and able to pay the higher cost for the service and/or the multiple-line telephone sets, and provide any additional space necessary for two telephone sets or a multiple-line telephone set, but most individuals were not. Further, the inconvenience of switching between two telephone sets made the two-line approach undesirable for household consumers.

The next improvement was call waiting. With call waiting, if the called party was engaged in a first call when a calling party tried to call, the central office would play a ringback signal to the calling party, and would signal the called party of the incoming call by periodically interrupting the first call by means of a tone or a click or other audible indicator. If the called party wished to answer the incoming call then the called party signaled the central office by momentarily pressing the hookswitch to generate a "hook-flash" signal. The central office would then place the first call on hold and connect the calling party to the called party. The called party could switch between the two calls by pressing the hookswitch. However, if the called party did not want to answer the incoming call then the called party simply ignored the audible indicator and, eventually, the calling party would hang up as the incoming call would remain unanswered.

This approach was satisfactory for many household consumers but created a new problem for small businesses. Many businesses had answering machines for use when the business was closed or when the called party was not available to answer the call. If someone tried to call during these times then the answering machine answered the call, played a prerecorded message, and recorded any information that the calling party wished to leave. However, if the called party was on another call then, because there is only one telephone line, the answering machine could not answer the call. So, in that case, the incoming call had to be answered by the called party or it was not answered at all. The calling party had no way of knowing whether the called party was on a call. The calling party merely knew that the call was not answered in person or by an answering machine. This gave the calling party that there was no one at the business to answer the call, or that the business did not care enough about its customers to answer a call or have an answering machine. The result was that the calling party was displeased with the apparent treatment of the call and, if this treatment was repeated several times, the calling party would eventually call a different business to purchase the desired product or service.

For example, if the called party has call waiting, but does not have the present invention or a CPE answering machine then, if the called party is on a first call when the calling party calls, the calling party will be irritated if the called party does not answer because: (1) the calling party will presume that the called party does not have an answering machine so the calling party cannot leave a message; (2) the calling party will know that the called party has an answering machine and be frustrated because the answering machine is not answering and so the calling party cannot leave a message; or (3) the calling party knows that the called party has an answering machine and also has call waiting and the calling party will know that, because the answering machine is not picking up, the called party must be on another call but not taking this call and so the calling party cannot leave a message with the called party or on the answering machine.

Therefore, one problem not addressed by the prior art is how best to accommodate an incoming call when a called party has call waiting and is already on a first call.

As described below, one solution to the above problem is to route an unanswered incoming call to an answering machine service provided by the telephone company. This provides answering machine capability without requiring two separate telephone lines to the business. However, there are different conditions wherein an incoming call may not be answered: (1) there is no one present at the called number to answer the incoming call; and (2) there is someone present at the called number but that person is currently on a first call and chooses not to answer the incoming call. This creates a problem because a message suitable for one condition may not be appropriate for the other condition. For example, assume that the business has call waiting, that the business is quite busy, and so the called party is on the telephone a substantial amount of time. If a second call, an incoming call, arrives then the called party may not answer because the called party is already on a first call. There is no answer so the call is forwarded to an answering machine service. If the message played by the answering machine service is that no one is there then the calling party, after hearing that message several times, will get the impression that the business is closed or is poorly staffed. The calling party may thus call elsewhere to obtain the goods or services needed. Conversely, if the business has closed for the night or weekend there will again be no answer so the call will be forwarded to an answering machine service. If the message played by the answering machine service is that the called party is busy, then the calling party will interpret the message to mean that the business is open. The calling party will therefore expect the call to be returned. The calling party will become irritated when the called party does not promptly return the call, and will believe that the business is too busy or not interested enough to return the call. The calling party may thus call elsewhere to obtain the goods or services needed. In either case, the message is inappropriate and so customers and potential customers may become dissatisfied and business opportunities may be lost.

Therefore, another problem not addressed by the prior art is how to properly advise a calling party of the reason for the call not being answered when a called party has call waiting regardless of whether the called party is or is not already on a first call.

Another problem of the prior art arises from the use of the existing call forwarding-call waiting-no answer feature. If the called party is on a first call, and there is an incoming call, and the called party does not take the incoming call, then, after a predetermined time, the central office will route the incoming call to some specified destination where, optimally, the calling party can hear a message and then leave a message for the called party. However, sometimes the incoming call is routed to the specified destination just before the called party is through with the first call. The called party is now through with the first call, and is willing to take the incoming call, but the incoming call is not available because it has been routed to another location. Therefore, the called party must call the messaging service to retrieve the message from the calling party and then return the call to the calling party. It would be an improvement if the called party could monitor the calling party leaving a message and connect to the calling party at any time before the calling party has hung up.

Although the above description of the problem is focused on a business environment, it will be appreciated that the same problem also occurs with respect to non-business environments.

SUMMARY OF THE INVENTION

The present invention provides a method for handling incoming calls when the called party has call waiting and the call waiting is active. If the called party is not on a call when an incoming call occurs and the called party does not answer the incoming call then a message is played to the calling party that the called party did not answer, and the calling party is given the opportunity to record a message for the called party. If the called party is on a call when an incoming call occurs then a call waiting signal is played to the called party and, if the called party does not answer the incoming call within a predetermined time, then a message is played to the calling party that the called party is busy, and the called party is given the opportunity to record a message for the called party. If the called party is engaged in a first call and a second call when an incoming call occurs then a message is played to the calling party that the called party is busy, and the called party is given the opportunity to record a message for the called party. Therefore, if the called party was on another call or other calls when the incoming call occurred then, if the incoming call is not answered by the called party, the calling party is advised that the called party is on another call and is offered the opportunity to leave a message. However, if the called party was not on another call when the incoming call occurred and the incoming call is not answered by the called party, then the calling party is advised that the called party did not answer and is offered the opportunity to leave a message. Therefore, the calling party knows whether the called party was on another call and the calling party can react accordingly and leave an appropriate message.

With call waiting, there is only a single line connected to the office or residence of the called party by the central office can switch this line between a first call and a second call. Therefore, the called party appears to have two lines: a first virtual line which is connected to the first call, and a second virtual line which is connected to the second call.

The present invention provides that, when an incoming call to a telephone line is not answered, the central office switch will determine whether the called party has call waiting, determine the status of the called party such as by determining whether the called party is already on another call, and forward the incoming call along with an indication of the status of the called party. Thus, the status indicates whether the incoming call is simply not answered or whether the incoming call is not answered because the called party is already on another call. The incoming call, along with the indication of the status of the called party, is forwarded to the destination specified by the called party. The destination receiving the forwarded call then has the information necessary to play the appropriate message to the calling party. The destination may be either customer premises equipment (CPE) or an automated telephone answering service (ATAS) device, such as, for example, a voicemail system.

In another embodiment, the present invention also provides that, when the called party is on a first call and an incoming call occurs then, if the incoming call is not answered, the incoming call is routed to an answering machine service provided by the telephone company along with an indication that the called party was already on another call.

When the called party is not on a first call, and an incoming call occurs, the called party may answer the call or allow the call to be answered by a CPE device, such as an on-premises answering machine. Thus, the message played by the CPE can be tailored to a specific condition, such as the business being closed for the night or for the holiday.

When the called party is on the line with a first call and an incoming call occurs, the called party may answer the incoming call or the called party may simply not answer the call, in which case the call is answered by an ATAS device after a no-answer timeout period. The condition (busy, not busy) of the called party will also be detected so that the ATAS device will play a message appropriate for the condition of the called party. Thus, when the called party is on a first call and so the called party does not answer the incoming call then the ATAS device will answer the incoming call and play a message indicating that the called party is on another line, or busy. Likewise, when the called party is not on a first call when the incoming call occurs and so the called party again does not answer the incoming call then the ATAS device will answer the incoming call and play a message indicating that the called party is not available to take the call.

Thus, when a person calls the called party, the calling party hears a message which can be tailored to give the desired impression as to the status of the business and thus the calling party is less likely to be distressed.

Of course, the messages may also provide other information such as hours of operation, emergency telephone numbers, directions, address, instructions on how to leave a message, etc.

The present invention provides a method for processing an incoming call from a calling party to a called party. The method includes determining whether the called party is busy, if the called party is not busy and a first predetermined time elapses without the called party answering the incoming call then playing a first message to the calling party, if the called party is busy and has call waiting then playing a call waiting signal to the called party, and if the called party does not accept the incoming call within a second predetermined time of the call waiting signal then playing a second, different message to the calling party. The method also includes recording a message from the calling party after playing the first message. The method also includes recording a message from the calling party after playing the second message.

The present invention also provides for processing an incoming call from a calling party to a called party having call waiting, the call waiting providing a first virtual line and a second virtual line. The method includes determining whether the called party is busy on the first virtual line or the second virtual line, if the called party is not busy on either the virtual line and a first predetermined time elapses without the called party answering the incoming call then playing a first message to the calling party, if the called party is busy on either the virtual line but not both the virtual lines then playing a call waiting signal to the called party, and if the called party does not accept the incoming call within a second predetermined time of the call waiting signal then playing a second, different message to the calling party. The method also includes playing the second message to the calling party if the called party is busy on both the virtual lines. The method also includes recording a message from the calling party after playing the first message. The method also includes recording a message from the calling party after playing the second message.

The present invention also provides a method for processing an incoming call from a calling party to a called party, the incoming call having been forwarded because the called party had call waiting and was on an existing call and did not answer the incoming call. The method includes accepting the forwarded incoming call, conferencing the forwarded incoming call with a specified destination, placing a new call to the called party, and if the called party accepts the new call then connecting the called party to the forwarded incoming call. The method also includes repeating placing another new call if a new call is returned.

The present invention provides a method for processing an incoming call from a calling party to a called party, the incoming call having been forwarded because the called party had call waiting and was on an existing call and did not answer the incoming call. The method includes accepting the forwarded incoming call, conferencing the calling party with a specified destination, placing a new call to the called party, and if the called party accepts the new call then playing a message to the called party regarding options for handling the incoming call. The method also includes connecting the called party to the calling party if the called party selects an option to accept the incoming call, and allowing the called party to monitor a conversation between the calling party and the specified destination if the called party selects an option to monitor the incoming call.

The present invention also provides an apparatus for processing an incoming call from a calling party to a called party the apparatus includes means for determining whether the called party is busy, means for measuring elapsed time, means for playing a first message to the calling party if the called party is not busy and a first predetermined time elapses without the called party answering the incoming call, means for playing a call waiting signal to the called party if the called party is busy and has call waiting, and means for playing a second, different message to the calling party if the called party does not accept the incoming call within a second predetermined time of the call waiting signal. The apparatus also includes means for recording a message from the calling party after the first message has been played. The apparatus also includes means for recording a message from the calling party after the second message has been played.

The present invention also provides an apparatus for processing an incoming call from a calling party to a called party having call waiting, the call waiting providing a first virtual line and a second virtual line. The apparatus includes means for determining whether the called party is busy on the first virtual line or the second virtual line, means for measuring elapsed time, means for playing a first message to the calling party if the called party is not busy on either the virtual line and a first predetermined time elapses without the called party answering the incoming call, means for playing a call waiting signal to the called party if the called party is busy on either the virtual line but not both the virtual lines, and means for playing a second, different message to the calling party if the called party does not accept the incoming call within a second predetermined time of the call waiting signal. The apparatus also includes means for recording a message from the calling party after the first message has been played. The apparatus also includes means for recording a message from the calling party after the second message has been played.

The present invention also provides an apparatus for processing an incoming call from a calling party to a called party, the incoming call having been forwarded because the called party had call waiting and was on an existing call and did not answer the incoming call. The apparatus includes means for accepting the forwarded incoming call, means for conferencing the forwarded incoming call with a specified destination, means for placing a new call to the called party, and means for connecting the called party to the forwarded incoming call if the called party accepts the new call.

The present invention also provides an apparatus for processing an incoming call from a calling party to a called party, the incoming call having been forwarded because the called party had call waiting and was on an existing call and did not answer the incoming call. The apparatus includes means for accepting the forwarded incoming call, means for conferencing the calling party with a specified destination, means for placing a new call to the called party, and means for playing a message to the called party regarding options for handling the incoming call if the called party accepts the new call. The apparatus includes means for connecting the called party to the calling party if the called party selects an option to accept the incoming call, and means for allowing the called party to monitor a conversation between the calling party and the specified destination if the called party selects an option to monitor the incoming call.

In the present invention, certain steps may be determined by the switch in the central office, such as a determination whether the called party is not accepting an incoming call because the called party is already on another telephone call and is ignoring the call waiting signal. However, the routing of the incoming call after the determination may be performed by the switch or by another device, such as a service circuit node.

Other objects, features, and advantages of the present invention will become apparent upon reading the following description of the preferred embodiment, when taken in conjunction with the drawings and the claims.

BRIEF DESCRIPTION OF THE DRAWINGS

FIGS. 2A and 2B are a flowchart of the process used by the switch.

DETAILED DESCRIPTION OF THE INVENTION

Figure 1:
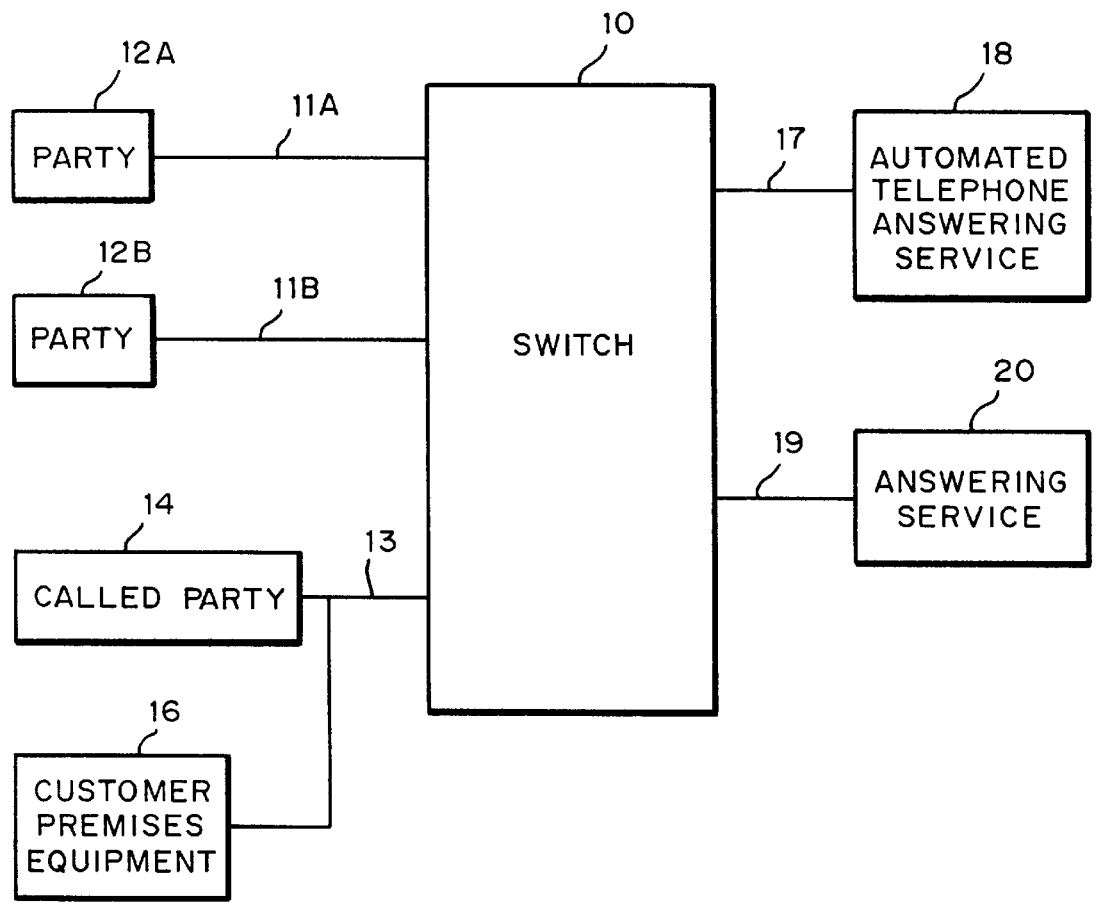
FIG. 1 is an illustration of the preferred environment of the present invention.

FIG. 1 is an illustration of the preferred environment of the present invention. The telephone company central office (CO) switch 10, such as a 1A ESS switch or a 5ESS switch, is connected by a plurality of telephone lines 11A, 11B, and 13 to a first party telephone 12A, a second party telephone 12B, and the called party telephone 14, respectively. Depending upon the customer's selection and the services offered by the telephone company, the switch 10 may also be connected by the telephone line 13 to a CPE device 16, by a communications link 17 to an ATAS device 18, or by a telephone 19 to an answering service 20. For ease of illustration and explanation, communications link 17 is shown as a single component. However, in the preferred embodiment, communications link 17 comprises both signalling and voice paths. The signalling path would be, for example, a simplified message desk interface (SMDI), which is well known in the art, and the voice path would be, for example, one or more conventional telephone trunks or lines. ANI and DNIS information, and the disposition of the call, such as the call state or status, are sent over the signalling link. The selection of ATAS device 18 or the answering service 20 is a customer (called party) preference. For convenience, the selection 18 or 20 is referred to herein as the specified destination. It will be appreciated that the ATAS device 18 could, if desired, be implemented as part of the switch 10. In this environment, the called party at telephone 14 has subscribed to the call waiting service. The examples below illustrate the operation of the switch 10 in the present invention.

Example 1: The called party 14 is not on the telephone and calling party 12A calls the called party 14. If the called party 14 does not answer then (1) the CPE device 16 answers the call if CPE device 16 is present, or (2) if the CPE device 16 is not present then the switch 10 forwards the call, along with a status indication, to the ATAS device 18, such as an answering machine service, or forwards the call to an answering service 20. The status indication is used by the ATAS device 18 or the answering service 20 to select the proper message to be played to the calling party 12A, such as, "I am sorry. The called party does not answer. Please leave a message at the tone."

Example 2: The called party 14 is on the telephone with a first call with calling party 12A and then calling party 12B calls the called party 14. The switch 10 signals the called party 14 that there is an incoming call. If the called party 14 does not answer the incoming call from calling party 12B then the switch 10 forwards the call, along with a status indication, to the ATAS device 18, such as an answering machine service, or forwards the call to an answering service 20. However, in this case, the status indication is busy. This status indication is used by the ATAS device 18 or the answering service 20 to select the proper message to be played to the calling party 12A, such as, "I am sorry. The called party is on another line. Please leave a message at the tone."

In contrast, existing switches 10 would forward the call but would simply indicate, in both examples, that the called party did not answer, which is the correct status for example 1 but is an incorrect status for example 2. Therefore, with existing switches 10, the message played to the calling party would be incorrect some of the time.

Of course, if the called party 14 is currently handling two calls then the call would be forwarded with a call forwarding-call waiting busy indication and the appropriate message played.

Figure 2B:
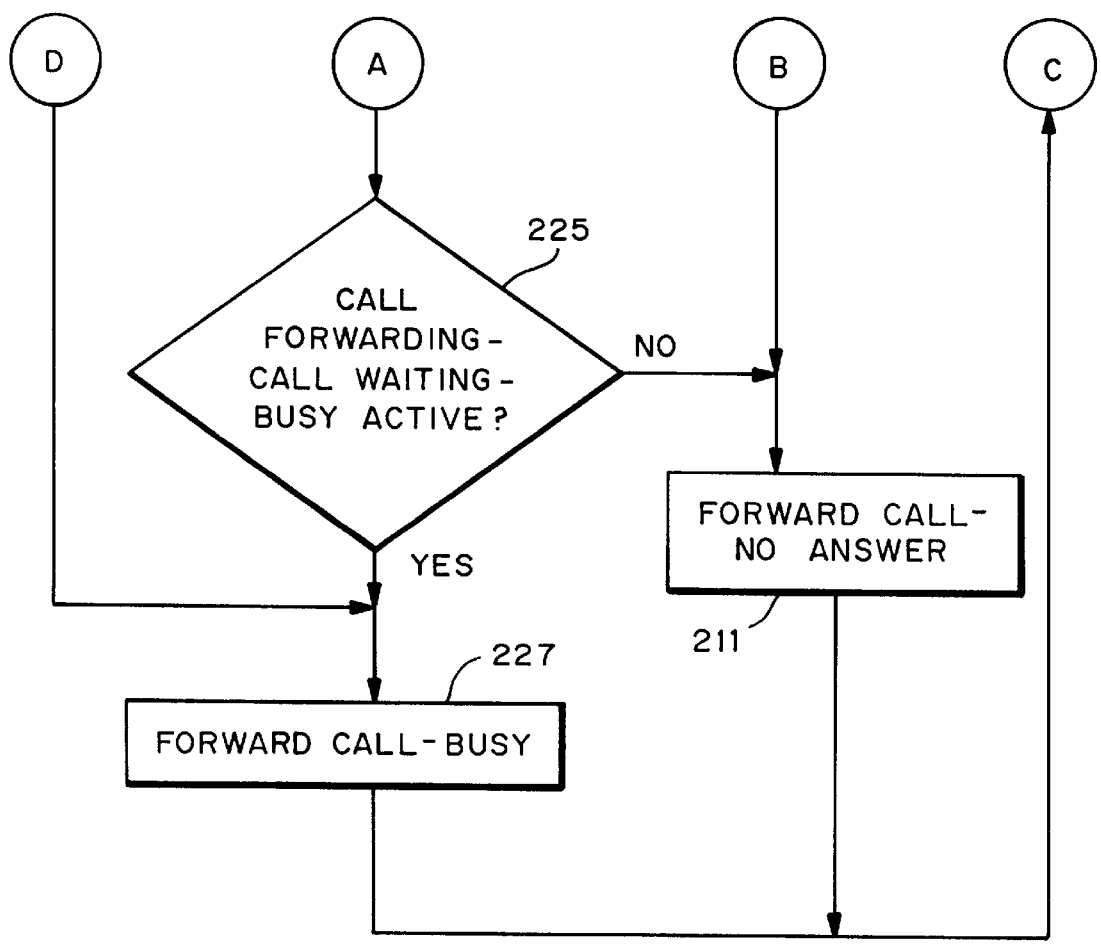

FIGS. 2A and 2B are a flowchart of the process used by the switch 10. The process is used to determine the status of the called party and, hence, the reason why the incoming call is not answered. Decision 201 tests whether there is an incoming call. If not, a loopback is made to decision 201 until there is an incoming call. Once an incoming call occurs then decision 203 tests the line of the called party to determine whether the line is busy, that is, the line is not idle, and, if busy, whether the called party 14 is handling one or two calls. If the line is not busy (the line is idle) then, in step 205, the switch 10 rings the telephone of the called party. Decision 207 tests whether call the forwarding-no answer feature or the call forwarding-call waiting-no answer feature is active. If neither is active then the call handling process is complete so the switch 10 then returns to decision 201 to wait for the next incoming call. If either feature is active then decision 209 tests whether the incoming call is answered by the called party (or by a CPE device at the called party telephone number). If the incoming call is not answered within a predetermined time or a predetermined number of rings then, in step 211, the call is forwarded to the specified destination, along with a "no answer" status indication. The call handling process is then complete so the switch 10 then returns to decision 201 to wait for the next incoming call. If, at decision 209, the incoming call is answered the call handling process is complete so the switch 10 then returns to decision 201 to wait for the next incoming call.

However, if, at decision 203, the line of the called party is busy with one call then decision 217 tests whether the call waiting feature is active. If not, then the switch plays a busy signal for the calling party in step 219. The call handling process is then complete so the switch 10 returns to decision 201 to wait for the next incoming call. If at decision 217 the call waiting feature is active then the switch 10 signals the called party at step 221 that the called party has an incoming call. Decision 223 tests whether the called party has accepted the incoming call. If the called party accepts the incoming call then the call handling process is complete so the switch 10 then returns to decision 201 to wait for the next incoming call. If the called party does not accept the incoming call within a predetermined time or a predetermined number of rings then decision 225 tests whether the call forwarding-call waiting-busy feature of the present invention is active. If not then the switch proceeds to step 211. If, at decision 225, the call forwarding-call waiting-busy feature of the present invention is active then, in step 227, the call is forwarded to the specified destination, along with a "busy" status indication. The call handling process is then complete so the switch 10 then returns to decision 201 to wait for the next incoming call.

At decision 203, if the called party 14 is currently handling two calls then step 227 is executed.

In step 223, although the timeout process described above is preferred, in an alternative embodiment the called party can also indicate non-acceptance of the call by pressing a specified key, for example, the "#", during the existing call.

For convenience, the forwarding status referred to in steps 211 and 227 have been referred to simply as "no answer" or "busy". However, it may be desirable to use a different name for such forwarding status, such as "call forwarding-call waiting-no answer" and "call forwarding-call waiting-busy", to distinguish these unique status conditions from the existing "call forward-no answer" and "call forward-busy" status conditions.

In the preferred embodiment, the time-out for the call forwarding-call waiting-no answer feature and the time-out for the call forwarding-call waiting-busy feature may be set independently, such as by a standard system feature or, preferably, by the user. This allows the call forwarding-call waiting-no answer feature to function as a backup for the CPE device 16 in the event that the CPE device 16 is not functioning. For example, the CPE device 16 may be set to answer after 4 rings. The call forwarding-call waiting-no answer timeout would then be set for 5 rings. Therefore, the CPE device 16 would have the first chance to answer an incoming call but, in the event that the CPE device 16 did not answer, then the call forwarding-call waiting-no answer feature would serve as a backup and forward the call to the specified destination.

However, the call forwarding-call waiting-busy timeout could be set for 3 rings so that, if the called party did not want to accept the incoming call, the calling party would not hear excessive rings before being forwarded to the specified destination.

Figure 3:
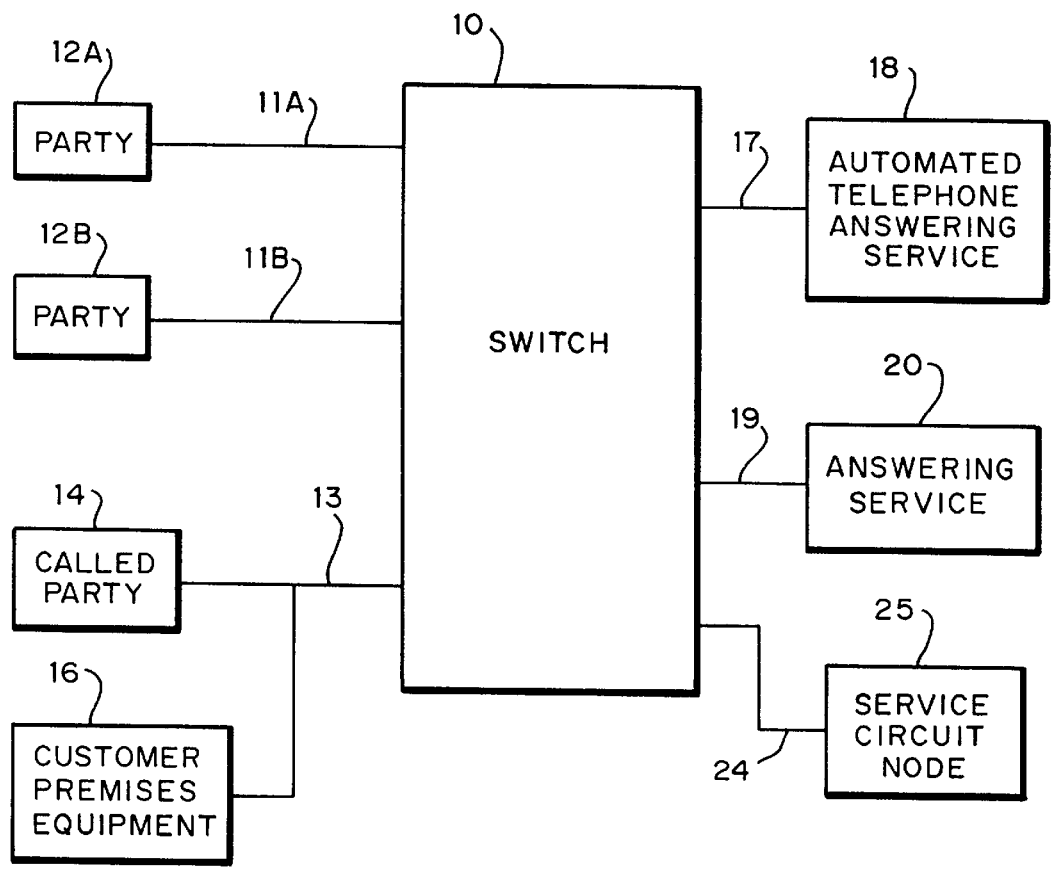
FIG. 3 is an illustration of another use of the present invention.

FIG. 3 is an illustration of another use of the present invention. FIG. 3 is similar to FIG. 1 except that a new component, service circuit node (SCN) 25 is added and is connected to the switch 10 by a communications link 24. For ease of illustration and explanation, communications link 24 is shown as a single component. However, in the preferred embodiment, communications link 24 comprises both signalling and voice paths. The signalling path would be, for example, the simplified message desk interface (SMDI), and the voice path would be, for example, one or more conventional telephone trunks or lines. ANI and DNIS information, and the disposition of the call, such as the call state or status, are sent over the signalling link. The ATAS device 18 may, if desired, be implemented by the SCN 25. This allows the called party 14 greater flexibility in answering an incoming call when the called party 14 is already on a first telephone call, such as with party 12A. In particular, this allows the called party 14 the ability to provide the calling party 12B with the option of waiting on hold until the called party 14 is through with the first telephone call, or to go to a messaging device 18 or answering service 19, and also allows the called party 14 to hear the message that is being left by the calling party 12B with the calling party 12B being aware that the called party 12 is listening. Further, the called party 14 may, at any time, terminate the connection of the calling party 12B to the device 18 or service 19 and be immediately connected with the calling party 12B. Assume that the called party 14 has the call forwarding-call waiting-busy feature of the present invention.

Assume first that the called party 14 is not on another call and that calling party 12B calls the called party 14. If the called party 14 does not answer, directly or via CPE 16, then the switch 10 will forward the call to the specified destination, which may be the ATAS device 18, an answering service 20, or the SCN 25.

Assume instead that the called party 14 is currently on a telephone call with a calling party 12A. Assume now that the calling party 12B calls the called party 14. The switch 10 will signal the called party 14 that there is an incoming call. If the called party 14 does not accept the incoming call then the switch 10 will forward the call to the SCN 25 along with the number of the calling party 12B (Automatic Number Identification—ANI), the number of the called party 14 (Dialed Number Information Service—DNIS), and the status indication—busy. The SCN 25 will then answer the call from the calling party 12B and will play a message for the calling party advising that the called party 14 is currently on another call and inquiring as to whether the calling party 12B wishes to wait on hold for the calling party 14 to finish the present telephone call or wishes to leave a message. The SCN 25 also advises the calling party 12B to indicate a preference by, for example, pressing "1" to hold, or "2" to leave a message.

If the calling party 12B presses "1" then the SCN 25 will place the calling party 12B on hold and, after a predetermined time, call the called party 14. If the called party 14 is no longer on another call and answers the call from the SCN 25 then the SCN 25 will notify the switch 10 to immediately connect the called party 14 to the calling party 12B and to disconnect the SCN 25 from the called party 14 and the calling party 12B. This may be accomplished by any one of several procedures, such as a "transfer" command, or a "conference" command followed by a "release" command.

If the called party 14 is still on another call then the switch 10 will signal the called party 14 that the called party has an incoming call (from SCN 25). If the called party 14 accepts the incoming call then the SCN 25 will notify the switch 10 to immediately connect the called party 14 to the calling party 12B and to disconnect the SCN 25 from the called party 14 and the calling party 12B.

However, if the called party 14 still does not accept the incoming call from SCN 25 then the switch 10 will forward the incoming call to SCN 25 with a call forwarding-call waiting-busy indication. The SCN 25 will read the ANI information and determine that the forwarded call is from itself so the called party 14 must still be on another call. The SCN 25 will then disconnect (hang up) both the call from the SCN 25 to the switch 10 and the forwarded call from the switch 10 to the SCN 25. Further, the SCN 25 will play another message to the calling party 12B advising that the called party 14 is still on another call and offering the calling party 12B the option of continuing to hold or leaving a message, as before.

If the calling party 12B elects to leave a message then the SCN 25 places a call to the specified destination and the SCN 25 connects the calling party 12B with the specified destination. The SCN 25 then places another call the called party 14. If the called party 14 is still on the other call and does not accept the incoming call from the SCN 25 the switch 10 will forward the call from the SCN 25 to the SCN 25. As long as both (1) the called party 14 is still on the other call and not accepting the call from the SCN 25, and (2) the calling party 12B is still leaving a message, then the SCN 25 will continue calling the called party 14.

If the called party 14 accepts the incoming call from the SCN 25 at any time while the calling party 12B is still leaving a message then the switch 10 will connect the called party 14 to the SCN 25. The SCN 25 will then establish a one-way connection from (1) the calling party 12B/specified destination to (2) the called party 14, so that the called party 14 can hear the message being left by the calling party 12B. The called party 14 can then: (a) hang up at any time; (b) continue listening to the calling party 12B leaving the message until the calling party 12B hangs up; or (c) intercept the calling party 12B by sending a signal to the SCN 25.

If the called party 14 hangs up then the switch 10 will terminate the connection between the called party 14 and the SCN 25, and the SCN 25 will then terminate the above one-way connection.

If the called party 14 continues listening to the calling party 12B leaving the message until the calling party 12B hangs up the switch 10 will terminate the connection between the calling party 12B and the SCN 25, and the SCN 25 will signal termination of the connection to the specified destination and the one-way connection to the called party 14 by hanging up, at which point the switch 10 will terminate the connections to the called party 14 and to the specified destination.

If the called party 14 intercepts the calling party 12B by sending a signal to the SCN 25 by, for example, pressing "6", the SCN 25 will signal the switch 10 to transfer the call from the calling party 12B to the called party 14, and the SCN 25 will also signal termination of the connection to the specified destination and the one-way connection to the called party 14 by hanging up, at which point the switch 10 will terminate the connections between the SCN 25, the called party 14, and the specified destination.

In another use of the present invention, the called party 14 is relying exclusively on the CPE device 16 to answer incoming calls when the called party 14 is not present to answer incoming calls, and relies on telephone company to answer incoming calls when the called party 14 is on another call and does not wish to answer the incoming call. Assume first that the called party 14 is not on another call and that there is an incoming call from calling party 12B. The switch 10 will ring the telephone of the called party. If the called party answers then the processing of the call is complete. If the called party does not personally answer then the CPE device 16 of the called party will answer, or the call will not be answered at all.

Assume now that the called party 14 is on another call with the party 12A or that the CPE device 16 has answered the call and is taking a message from the party 12A. Assume now that there is an incoming call from calling party 12B. The switch 10 will signal the called party 14 that there is an incoming call. If the called party accepts the incoming call from the calling party 12B then the processing of the call is complete. If the called party 14 does not answer the incoming call or does not accept the incoming call then, after timeout, the switch 10 will forward the call to the SCN 25. In this case, the status information (call forwarding-call waiting-busy line) may be provided by the switch 10 and may be reviewed by the SCN 25 but the status information is not necessary because, for this called party 14, the only reason for the switch 10 to forward the call to the SCN 25 is that the called party 14 was already on another line and chose not to answer the incoming call. The SCN 25 then forwards the call to the specified destination.

The SCN 25, instead of simply forwarding the call, may call the specified destination and also call the called party 14. In this manner, as described above, the incoming call is maintained so that the called party 14 can elect to accept or monitor the incoming call at any time before the calling party 12B hangs up.

Figure 4A:
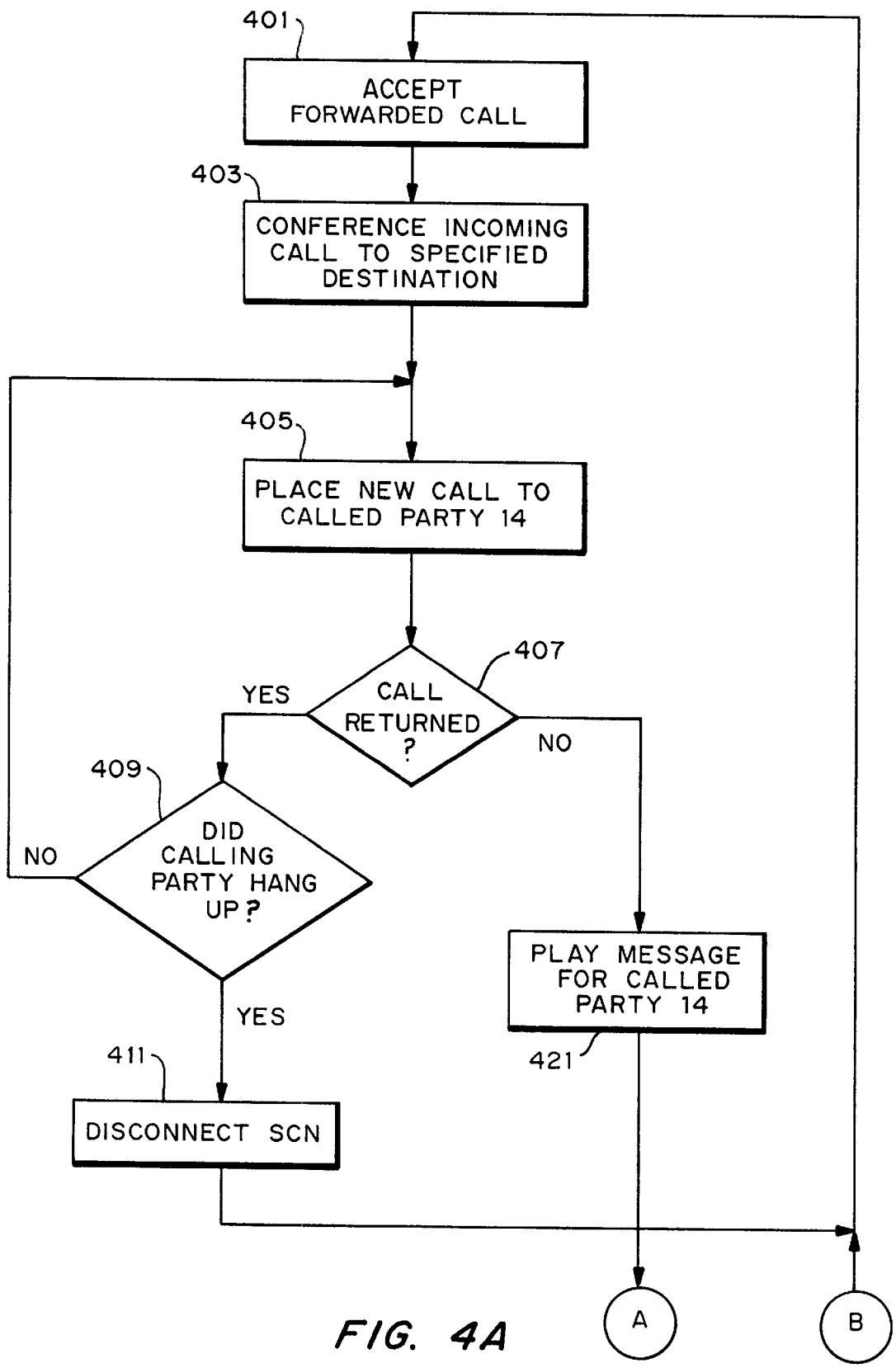
FIGS. 4A and 4B are a flowchart of the process used by the service circuit node.
Figure 4B:
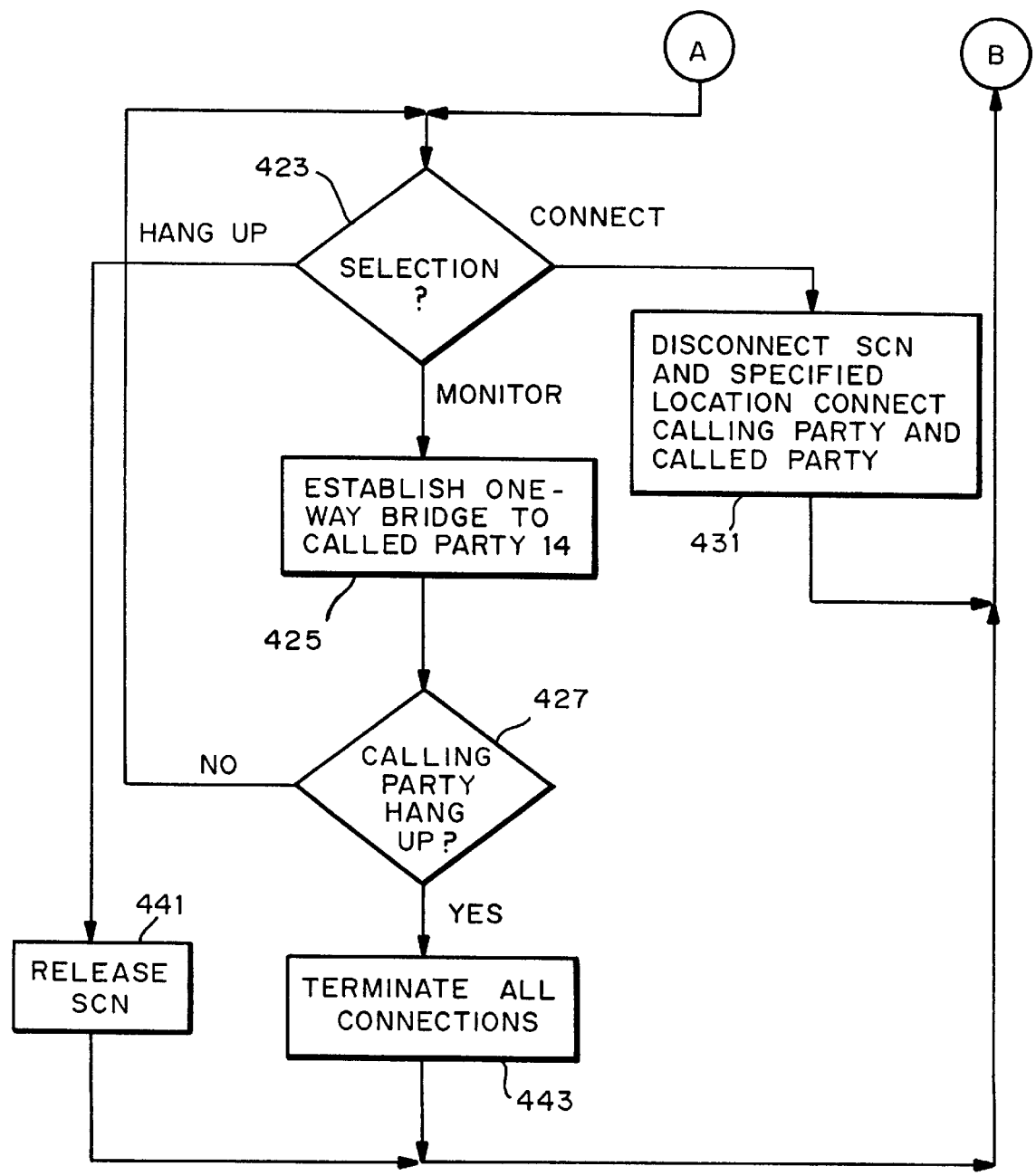

FIGS. 4A and 4B are a flowchart of the process used by the service circuit node. Assume that the called party 14 is currently on a call to a party 12A and a calling party 12B calls the called party 14. At step 401 the SCN 25 receives the forwarded call (call forwarding-call waiting-busy) from the switch 10. The SCN 25 then, at step 403, conferences the incoming call from calling party 12B to the specified destination. In step 405 a call is placed by the SCN 25 to the called party 14. Decision 407 tests whether the switch 10 has returned the call placed by the SCN 25 to the called party 14. If the call has been returned then decision 409 tests whether the calling party 12B has hung up. If not then the SCN 25 returns to step 405. If the calling party 12B has hung up then in step 411 the SCN 25 disconnects from the calling party 12B and the specified destination. The SCN 25 then returns to step 401 to wait for the next forwarded call.

If, at decision 407, the call from the SCN 25 to the called party 14 was not returned by the switch 10 then the called party 14 has accepted the call from the SCN 25. The SCN 25 then preferably plays a message to the called party 14 instructing the called party 14 to press a first key, for example, the # key, to connect to the calling party 12B, or to press a second key, for example, the * key, to monitor the calling party 12B, or to hang up if neither connecting nor monitoring is desired.

If at decision 423 the called party 14 hangs up then, in step 441, the SCN 25 instructs the switch 10 to release (disconnect) the SCN 25 from the connection between the calling party 12B and the specified destination. This allows the called party 14 to take some other action, such as placing a call or leaving the office, while allowing the calling party 12B to finish leaving a message. The SCN 25 then returns to step 401 to wait for the next forwarded call.

If at decision 423 the called party 14 specifies connection then, in step 431, the SCN 25 instructs the switch 10 to connect the called party 14 and the calling party 12B, and to disconnect the specified destination and the SCN 25 from any connections to the called party 14 or the calling party 12B. The SCN 25 then returns to step 401 to wait for the next forwarded call.

If at decision 423 the called party 14 specifies monitoring then in step 425 the SCN 25 provides the one-way connection described above to the called party 14 from the calling party 12B and the specified destination. Decision 427 tests whether either the calling party 12B has hung up. If not then a return is made to decision 423. If the calling party 12B has hung up then in step 443 the SCN 25 instructs the switch 10 to disconnect the calling party 12B, the called party 14, the SCN 25, and the specified destination.

In the preferred embodiment, the present invention is implemented by computer programs loaded into a memory in, and executed by, the switch 10 and the SCN 25.

Although the preferred embodiment of the present invention uses a status indicator, such as a bit or bits sent along with the ANI and DNIS information, the present invention is not so limited and other techniques may be used. For example, the switch 10 or the SCN 25 could forward the incoming call to a first telephone number on call forwarding-call waiting-no answer and to a second, different telephone number on call forwarding-call waiting-busy. The telephone number on which the incoming call was forwarded thus indicates the reason why the call was forwarded.

Thus, the call forwarding-call waiting-busy feature of the present invention allows the customer, the called party 14, to completely control the handling of incoming calls, regardless of whether the called party 14 is on another call or does not answer at all.

The call forwarding-call waiting-busy feature of the present invention also provides for the delivery of a message to the calling party which accurately represents the reason why the called party is not answering the incoming call.

It will be appreciated from the above that the present invention provides for accurately determining the condition of a called party.

It will also be appreciated from the above that the present invention provides for playing a message to a calling party which message is responsive to the reason why the called party did not answer the incoming call.

The present invention also provides for allowing a called party to control the disposition and handling of an incoming call.

From a reading of the description above of the preferred embodiment of the present invention, modifications and variations thereto may occur to those skilled in the art. Therefore, the scope of the present invention is to be limited only by the claims below.

I claim:

1. A method for processing an incoming call on a telephone line from a calling party to a called party, said method comprising the steps of:

determining whether said telephone line of said called party is busy;

if said called party is not busy and a first predetermined time elapses without said called party answering said incoming call then playing a first message to said calling party;

if said called party is busy and has call waiting then playing a call waiting signal to said called party; and if said called party does not accept said incoming call within a second predetermined time of said call waiting signal then playing a second, different message to said calling party.

2. The method of claim 1 and further comprising the step of recording a message from said calling party after playing said first message.

3. The method of claim 1 and further comprising the step of recording a message from said calling party after playing said second message.

4. The method of claim 1, wherein said first message includes information that said incoming call was not answered, and said second message includes information that said called party is on another call.

5. An apparatus for processing an incoming call on a telephone line from a calling party to a called party, said apparatus comprising:

means for determining whether said telephone line of said called party is busy;

means for measuring elapsed time;

means for playing a first message to said calling party if said called party is not busy and a first predetermined time elapses without said called party answering said incoming call;

means for playing a call waiting signal to said called party if said called party is busy and has call waiting; and means for playing a second, different message to said calling party if said called party does not accept said incoming call within a second predetermined time of said call waiting signal.

6. The apparatus of claim 5 and further comprising means for recording a message from said calling party after said first message has been played.

7. The apparatus of claim 5 and further comprising means for recording a message from said calling party after said second message has been played.

8. The apparatus of claim 5, wherein said first message includes information that said incoming call was not answered, and said second message includes information that said called party is on another call.

9. In a telecommunications system wherein a called party subscribes to a call waiting service with respect to a telephone line, and a calling party makes a call to the telephone line of the called party, a method for informing the calling party about status of the telephone line after the call to the called party with the call waiting service on the telephone line goes unanswered, comprising:

providing the calling party with a message about the status of the telephone line after the call to the telephone line of the called party with the call waiting service goes unanswered upon determining (1) that the telephone line is not busy, and (2) that a predetermined time or a predetermined number of rings have elapsed without the call having been accepted; and providing the calling party with a different message about the status of the telephone line after the call to the telephone line of the called party with the call waiting service goes unanswered upon determining (1) that the telephone line is busy, and (2) that a preselected time has elapsed after a call waiting signal has been played to the telephone line without the call having been accepted.

10. The method of claim 9 wherein the message about the status of the telephone line comprises information that the call was not answered.

11. The method of claim 9 wherein the different message about the status of the telephone line comprises information that said called party is on another call.

12. With respect to a telephone line having active calling waiting service, a method for providing a calling party, who has placed a call to the telephone line, with information about status of the telephone line after the call to the telephone line with the active call waiting service goes unanswered, comprising:

determining whether the status of the telephone line is busy or not busy;

if not busy, then playing a message to the calling party; after a predetermined number of rings or a preselected time if busy, then playing a call waiting signal on the telephone line; and if the call is not accepted in response to the call waiting signal, then playing a different message to the calling party, whereby the calling party is provided with the information about the status of the telephone line by the message, which is provided if the calling line is not busy, or by the different message, which is provided if the calling line is busy and the call is not accepted in response to the call waiting signal.

13. The method of claim 12 wherein the message comprises an announcement about the status of the telephone line that the call was not answered; and wherein the different message comprises a different announcement about the status of the telephone that the telephone line is engaged in another call.

* * * * *